2,997,420
PIGMENTED FIBERS OF ENHANCED ADHESION TO RUBBER

Rutherford B. Hill, St. Albans, W. Va., assignor to Monsanto Chemical Company, St. Louis, Mo., a corporation of Delaware
No Drawing. Filed May 16, 1956, Ser. No. 585,156
3 Claims. (Cl. 154—136)

The present invention relates to an improved method for the treatment of fibers. More particularly the invention relates to a method of obtaining improved adhesion or bonding between rubber and various fibers whether in the form of cord, yarn, fabric or filaments, as well as to the improved products thereby obtained. The invention particularly relates to the improvement in adhesion between rubber and synthetic fibers such as rayon and nylon.

Many manufactured rubber articles include fibers in the composition in the form of a sheet, cord, or even of filaments. Examples of such composition are tires, belting, hose and soles. Even under the best bonding conditions heretofore possible, and particularly in service where repeated flexings of the composition occur, separation of the rubber and fiber often results, thereby causing a weakening and frequently a failure of the product. This situation has resulted in developing a demand for a satisfactory agent to improve the adhesion between the cord or fabric and the rubber. It is an object of this invention to provide such an agent.

In accordance with the present invention it has been found that by treating a fiber with a dispersion of an inorganic material of relatively high specific gravity, increased adhesion of compounded rubber to the fiber results. Preferably inorganic rubber compounding pigments possessing a specific gravity of about 4 are employed and are used at a concentration of 40 to 60% by weight. In general the inorganic pigment will have a specific gravity between 2.6 and 4.3. Adhesion is generally increased by employing the pigment in conjunction with a diene polymer latex. As the latex there may be used Hevea rubber or butadiene-styrene copolymer latex of conventional GR–S rubber type, but preferably there is used a latex substantially of 70% styrene–30% butadiene content. Typical of the preferred type of inorganic materials employed are titanium dioxide, Dixie clay (a hard kaolin for rubber compounding) and lithopone.

In order to set forth clearly and concisely the principles of the invention, it will be described in detail by the examples that follow with particular reference to rayon and nylon cord. However, it is to be understood that other fibers may be substituted.

The objects of the invention are accomplished in general by applying to the core in any suitable manner the rubber latex-inorganic material suspension or dispersion. This may be accomplished most readily by passing the cord through the suspension until the desired weight of composition has been deposited on the fiber, or if the fibers are in the form of a woven piece, then the suspension is added by spreader action. The treated cord is then embedded in a rubber compound and subsequently vulcanized to form a reinforced rubber article possessing improved properties. The rubber compound employed will of course contain the usual vulcanizing agents, accelerators, antioxidants, stabilizers and fillers. In its preferred and common form, the invention contemplates the use of any compounded rubber stock, whether of natural or synthetic rubber, such as is commonly employed in the fabrication of automobile tires, hose, raincoat materials, shoes, beltings such as conveyor belts, fan belts and driving belts, as well as many articles described as mechanical goods wherein fibers are employed in construction of the article and where the article is subjected to repeated flexing in use.

In an example of the invention, rayon tire cord of the type suitable for and commonly used in the manufacture of automobile tires was treated with an aqueous dispersion of the inorganic pigment in an Attritor or ball mill. The dispersion was placed in an aluminum dish and the cord passed over a series of ½″ pulleys and through the test material. The treated cord was air dried and then wound on a spool. The cord was weighed before and after treatment to determine the percentage of pickup of material deposited on the cord.

Compounded rubber stocks were then prepared in the usual manner from the following compositions:

|  | Parts by Weight | |
| --- | --- | --- |
|  | Stock 1 | Stock 2 |
| GR–S 1500 | 100.0 |  |
| Hevea-Smoked Sheets |  | 100.0 |
| Stearic acid |  | 1.0 |
| Sulfur | 3.0 | 2.5 |
| 2,2′-Dithiobisbenzothiazole | 1.5 | 0.75 |
| Paraffin | 7.5 | 3.0 |
| Carbon black | 25.0 | 25.0 |
| Zinc oxide | 5.0 | 5.0 |

[1] Styrene-butadiene copolymer rubber made at 41° F.

The adhesion of the treated cord to those compositions was determined by placing the cord between sample portions of the raw stock, vulcanizing the assembly and measuring the force necessary to pull out the cord. The test sample pieces were prepared by use of an improved mold developed after experience with the Armstrong mold. In order to avoid distortion of the rubber under stress, thicker rubber sections were used. Complete details of the Armstrong mold are described in India Rubber World, May 1946, pages 213–219. The specimens were still H shaped with the cross bar of the H representing cord extending through two sections of the rubber but the rubber was in the form of cylinders ½″ in diameter and 1″ in height. The mold was composed of four 5″ x 18″ sections with the top and bottom solid plates to retain the rubber in the cavities of two perforated plates. The two halves of the inner section were 9/16″ thick and contained two rows of 10 perforations. Cord channels about 30/1000″ ran lengthwise across the diameters of the perforations. Overflow channels 1/16″ deep were provided in both sections (at the top and bottom of the cylinders) to equalize the pressure.

The rubber compositions described hereinbefore as stocks 1 and 2 were extruded and cut into lengths approximately equal to one-half the height of the cylinders. The treated cord was placed across the samples, the second perforated plate, also filled with identical samples, was placed on top and the two perforated plates so built up were placed between the solid plates and the completed assembly vulcanized by heating in a press for 30 minutes at 158° C. The cord was cut between each pair of cured cylinders to provide the H-shaped specimens, the sides of the H representing the rubber cylinders. Essentially the quantity measured was the force required to pull a single cord in the direction of its axis from a cylinder of rubber in which one length of a cord of a given length was embedded. Thus, the quantity measured was the pounds shearing force acting across the cord to rubber interface. The adhesion preferably was measured by a Dillon tester with the jaw speed of the tester moving 12 inches per minute.

The results obtained by treating the cord as described are set forth in tabular form below wherein Table 1 gives results obtained with rayon cord and Table 2 gives results obtained with nylon cord. The inorganic pigment shown was dispersed in water with the aid of 2% dispersing aid to produce a 50% dispersion. The combinations with the latex were all prepared so as to provide equal weights of polymer solids and pigment. In other words, an amount of the 50% pigment dispersion was added to the latex to provide pigment equal to the dry weight of the polymer. Addition of 2% casein on the total solids content was found desirable to increase the mechanical stability. In the tables below B–S–30 indicates a butadiene-styrene copolymer latex of 70% butadiene and 30% styrene (GR–S latex type IV) whereas B–S–70 indicates a butadiene-styrene copolymer latex of 30% butadiene and 70% styrene. The percent pickup indicates the weight increase of the pigment or latex-pigment mixture deposited on the fiber. The pull out value indicates the pounds of force necessary to pull one end of the cord out of the vulcanized rubber matrix. The adhesion value is a relative rating which compares the test compound with the untreated control. The untreated control in the results shown is assigned an arbitrary value of 0 and a value of 25 in the table would indicate that the treated sample was 25% better than the control. The results follow:

TABLE 1

*Rayon cord*

STOCK 1

| | Percent Pickup | Pull out Value | Adhesion Value |
| --- | --- | --- | --- |
| Control | 0 | 8.3 | 0 |
| Lithopone | 26.8 | 10.0 | 21 |
| Lithopone+B–S–30 | 65.0 | 15.0 | 81 |
| Lithopone+Hevea latex | 44.4 | 13.5 | 63 |
| Lithopone+B–S–70 | 38.0 | 20.8 | 150 |
| Clay+B–S–30 | 32.4 | 14.6 | 76 |
| Clay+Hevea latex | 36.0 | 11.0 | 32 |
| Clay+B–S–70 | 31.6 | 18.0 | 116 |
| $TiO_2$ | 16.0 | 13.7 | 65 |
| $TiO_2$+B–S–70 | 16.0 | 13.7 | 65 |
| Mixed Pigments [1]+B–S–30 | 15.1 | 16.0 | 93 |
| Mixed Pigments [1]+B–S–70 | 49.8 | 19.5 | 134 |
| Mixed Pigments [1]+Hevea latex | 41.9 | 13.8 | 66 |

STOCK 2

| | Percent Pickup | Pull out Value | Adhesion Value |
| --- | --- | --- | --- |
| Control | 0 | 5.3 | 0 |
| Lithopone | 26.8 | 7.8 | 47 |
| Lithopone+B–S–30 | 65.0 | 6.2 | 17 |
| Lithopone+Hevea latex | 44.4 | 9.0 | 70 |
| Lithopone+B–S–70 | 38.0 | 15.0 | 184 |
| Clay+B–S–30 | 32.4 | 9.0 | 70 |
| Clay+Hevea latex | 36.0 | 10.7 | 102 |
| Clay+B–S–70 | 31.6 | 13.5 | 155 |
| $TiO_2$ | 16.0 | 8.3 | 56 |
| $TiO_2$+B–S–70 | 16.0 | 9.0 | 70 |
| Mixed Pigments [1]+B–S–30 | 15.1 | 9.0 | 70 |
| Mixed Pigments [1]+B–S–70 | 49.8 | 13.0 | 146 |
| Mixed Pigments [1]+Hevea latex | 41.9 | 10.6 | 102 |

See Table 2 for footnote 1.

TABLE 2

*Nylon cord*

STOCK 1

| | Percent Pickup | Pull out Value | Adhesion Value |
| --- | --- | --- | --- |
| Untreated control | 0 | 5.3 | 0 |
| Hevea latex control | 15.2 | 6.1 | 15 |
| B–S–30 control | 13.7 | 8.0 | 51 |
| B–S–70 control | 13.7 | 7.0 | 32 |
| $TiO_2$ | 11.2 | 6.0 | 15 |
| $TiO_2$+B–S–70 | 15.7 | 8.0 | 51 |
| Mixed Pigments [1]+B–S–70 | 58.7 | 12.5 | 136 |

STOCK 2

| | Percent Pickup | Pull out Value | Adhesion Value |
| --- | --- | --- | --- |
| Untreated control | 0 | 5.0 | 0 |
| Hevea latex control | 15.2 | 5.9 | 11 |
| B–S–30 control | 13.7 | 7.6 | 52 |
| B–S–70 control | 13.7 | 5.8 | 16 |
| $TiO_2$+B–S–70 | 15.7 | 7.0 | 40 |
| Mixed Pigments [1]+B–S–70 | 58.7 | 10.0 | 100 |
| Mixed Pigments [1]+B–S–30 | 21.8 | 9.0 | 80 |
| Mixed Pigments [1]+Hevea latex | 91.5 | 9.2 | 85 |

[1] The pigment consisting of 62.4 parts $TiO_2$, 17 parts lithopone and 20.6 parts Dixie clay, 100 parts mixed pigment compounded with 100 parts latex (dry basis).

It is apparent from the results shown that treatment of the fibers in the manner described greatly increases the adhesion of the cord to vulcanized rubber. Although the most beneficial results follow from the use of a high styrene content latex as the carrier agent for the inorganic pigment, very satisfactory results are realized from the use of regular GR–S latex or of Hevea latex itself. So-called synthetic latex paints in which a mixture of several inorganic pigments are combined also exhibit excellent results.

It is intended to cover all changes and modifications of the examples of the invention herein chosen for purposes of disclosure which do not constitute departures from the spirit and scope of the invention.

What is claimed is:

1. The method of preparing fiber reinforced vulcanized rubber articles which comprises applying to rayon fiber a fluid mixture of an aqueous dispersion of 40–60% finely divided mineral pigment for rubber compounding selected from the group consisting of hard clay, lithopone, titanium dioxide and mixtures thereof and high styrene content styrene-butadiene copolymer latex in which mixture the copolymer solids are approximately equal to the weight of the aforesaid pigment, embedding the treated fiber in sulfur vulcanizable styrene-butadiene rubber matrix and vulcanizing.

2. The method of preparing fiber reinforced vulcanized rubber articles which comprises applying to rayon fiber a fluid mixture of an aqueous dispersion of 40–60% finely divided mineral pigment for rubber compounding selected from the group consisting of hard clay, lithopone, titanium dioxide and mixtures thereof and high styrene content styrene-butadiene copolymer latex in which mixture the copolymer solids are approximately equal to the weight of the aforesaid pigment, embedding the treated fiber in sulfur vulcanizable natural rubber matrix and vulcanizing.

3. The method of preparing fiber reinforced vulcanized rubber articles which comprises applying to rayon fiber a fluid mixture of an aqueous dispersion of inorganic finely divided mineral pigment for rubber compounding and styrene-butadiene copolymer latex in which the styrene content of the copolymer is 70% said mixture consisting of aqueous vehicle, dispersing agent, substantially 100 parts by weight of said styrene-butadiene copolymer solids, substantially 62.4 parts by weight of titanium dioxide, substantially 17 parts by weight of lithopone and substantially 20.6 parts by weight of hard kaolin, embedding the treated fiber in sulfur vulcanizable styrene-butadiene rubber matrix and vulcanizing.

References Cited in the file of this patent

UNITED STATES PATENTS

| | | |
|---|---|---|
| 1,567,506 | Hopkinson | Dec. 29, 1925 |
| 1,627,278 | Dewey | May 3, 1927 |
| 1,987,350 | Reel | Jan. 8, 1935 |
| 2,209,928 | Nowak et al. | July 30, 1940 |
| 2,335,104 | Britt et al. | Nov. 23, 1943 |
| 2,380,775 | Meyer | July 31, 1945 |
| 2,399,947 | Somerville | May 7, 1946 |
| 2,431,001 | Sullivan | Nov. 18, 1947 |
| 2,511,629 | Entwistle | June 13, 1950 |
| 2,544,666 | Goebel | Mar. 13, 1951 |
| 2,570,895 | Wilson | Oct. 9, 1951 |